(12) United States Patent
Ullrich et al.

(10) Patent No.: US 9,812,165 B2
(45) Date of Patent: Nov. 7, 2017

(54) SYSTEMS AND METHODS FOR RECORDING HAPTIC DATA FOR USE WITH MULTI-MEDIA DATA

(71) Applicant: IMMERSION CORPORATION, San Jose (CA)

(72) Inventors: Christopher J. Ullrich, Ventura, CA (US); Robert Lacroix, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 181 days.

(21) Appl. No.: 14/576,589

(22) Filed: Dec. 19, 2014

(65) Prior Publication Data
US 2016/0180879 A1    Jun. 23, 2016

(51) Int. Cl.
| | |
|---|---|
| H04N 5/77 | (2006.01) |
| H04N 5/932 | (2006.01) |
| H04N 5/935 | (2006.01) |
| G11B 20/10 | (2006.01) |
| G06F 3/01 | (2006.01) |
| G06F 3/03 | (2006.01) |
| G01H 9/00 | (2006.01) |

(Continued)

(52) U.S. Cl.
CPC ......... *G11B 20/10527* (2013.01); *G01H 9/00* (2013.01); *G06F 3/016* (2013.01); *G06F 3/03* (2013.01); *H04N 5/265* (2013.01); *H04N 5/77* (2013.01); *H04N 9/79* (2013.01); *H04N 9/8205* (2013.01); *G06F 3/0304* (2013.01); *G06F 3/0346* (2013.01); *G11B 27/10* (2013.01); *G11B 2020/10537* (2013.01)

(58) Field of Classification Search
USPC ................ 386/227, 228, 201, 200, 239, 242
See application file for complete search history.

(56) References Cited

U.S. PATENT DOCUMENTS

| | | |
|---|---|---|
| 7,623,114 B2 | 11/2009 | Rank |
| 7,911,328 B2 | 3/2011 | Luden et al. |

(Continued)

FOREIGN PATENT DOCUMENTS

WO    WO 2011/011737    1/2011

OTHER PUBLICATIONS

Bannach, D., et al., "Automatic Event-Based Synchronization of Multimodal Data Streams from Wearable and Ambient Sensors," EuroSSC 2009, LNCS 5741, 2009, pp. 135-148.

*Primary Examiner* — Daquan Zhao
(74) *Attorney, Agent, or Firm* — Miles & Stockbridge P.C.

(57) ABSTRACT

A system includes a recorder configured to record audio and/or video of a subject of interest and output a recording of the subject of interest and a non-contact sensor associated with the recorder. The non-contact sensor is constructed and arranged to measure movement and/or vibration of the subject of interest from substantially the same perspective and at the same time as the recorder. The system includes a controller configured to transform the measured movement and/or vibration of the subject of interest measured by the non-contact sensor into a tactile data stream for sending to a haptic display device for playback with the recording of the subject of interest by the recorder and providing haptic effects corresponding to the measured movement and/or vibration to a user of the haptic display device in synchronization with the recording.

20 Claims, 7 Drawing Sheets

(51) Int. Cl.
  *H04N 5/265* (2006.01)
  *H04N 9/79* (2006.01)
  *H04N 9/82* (2006.01)
  H04N 5/765 (2006.01)
  H04N 9/80 (2006.01)
  G11B 27/10 (2006.01)
  G06F 3/0346 (2013.01)

(56) References Cited

U.S. PATENT DOCUMENTS

| | | |
|---|---|---|
| 7,979,146 B2 | 7/2011 | Ullrich et al. |
| 8,000,825 B2 | 8/2011 | Ullrich et al. |
| 8,378,964 B2 | 2/2013 | Ullrich et al. |
| 2005/0062841 A1 | 3/2005 | Rivera-Cintron |
| 2007/0236449 A1 | 10/2007 | Lacroix et al. |
| 2008/0223627 A1 | 9/2008 | Lacroix et al. |
| 2009/0086015 A1* | 4/2009 | Larsen .................... F41G 3/165 348/46 |
| 2009/0096632 A1 | 4/2009 | Ullrich et al. |
| 2011/0007139 A1* | 1/2011 | Brunetti ........... G08B 13/19613 348/51 |
| 2011/0202155 A1 | 8/2011 | Ullrich et al. |
| 2011/0215913 A1 | 9/2011 | Ullrich et al. |
| 2012/0206246 A1 | 8/2012 | Cruz-Hernandez et al. |
| 2012/0206247 A1 | 8/2012 | Bhatia et al. |
| 2014/0093221 A1 | 4/2014 | Wikander |
| 2014/0205260 A1* | 7/2014 | Lacroix ................. H04N 5/765 386/201 |

* cited by examiner

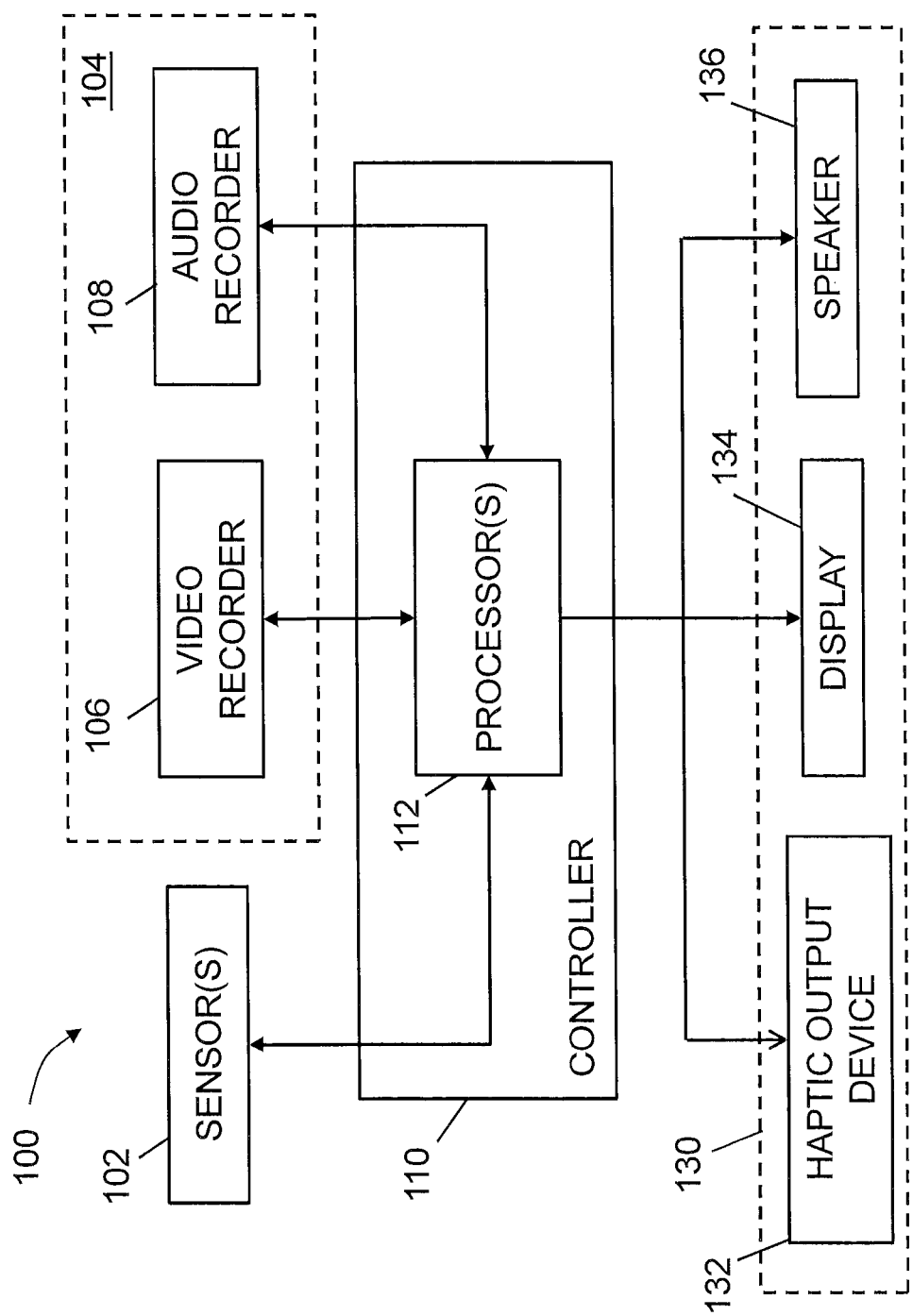

SYSTEMS AND METHODS FOR RECORDING HAPTIC DATA FOR USE WITH MULTI-MEDIA DATA

FIELD

The present invention is directed to systems and methods for recording haptic data for use with multi-media data.

BACKGROUND

In both live and pre-produced content creation, there are well-established techniques for setting up and capturing action. In the case of a location based live sporting event, for example, a site producer typically arrives one to two weeks in advance of the event to setup a variety of camera positions in order to create a compelling live production (broadcast) stream of multi-media data from the location. It is normal for a site production crew to pre-mix a set of on-location microphones to create an "egocentric" sound field for each camera position to enrich the experience for recipients of the broadcasted content.

For example, at a sports stadium, cameras that are mounted high above the stands may include both crowd sound effects and on-field sound effects mixed equally. Field-side cameras can have parabolic or focused microphones to create a greater sense of on-field presence. Athlete mounted cameras may have athlete mounted microphones and be mixed with field-side cameras to provide an athlete-centric and stadium experience. Although similar strategies are used for pre-produced content for movies and television, there is significantly more audio post-production editing that is done to create the final product.

SUMMARY

It is desirable to create a more immersive experience for audiences viewing live sports events and other entertainment on electronic devices by adding haptic content to the broadcast that can be streamed and played back to users of the electronic devices. It is also desirable to make the haptic content more pervasive by making real-world haptic data easier to obtain and transforming the real-world haptic data with as little human intervention as possible in order to facilitate propagation and user acceptance of the experience.

According to an aspect of the invention, there is provided a system that includes a recorder configured to record audio and/or video of a subject of interest and output a recording of the subject of interest, and a non-contact sensor associated with the recorder. The non-contact sensor is constructed and arranged to measure movement and/or vibration of the subject of interest from substantially the same perspective and at the same time as the recorder. The system includes a controller configured to transform the measured movement and/or vibration of the subject of interest measured by the non-contact sensor into a tactile data stream for sending to a haptic display device for playback with the recording of the subject of interest by the recorder and providing haptic effects corresponding to the measured movement and/or vibration to a user of the haptic display device in synchronization with the recording.

In an embodiment, the non-contact sensor includes a laser vibrometer. In an embodiment, the non-contact sensor includes a tracking device.

In an embodiment, the non-contact sensor includes video stream analysis algorithms.

In an embodiment, the recorder and the non-contact sensor are co-located.

In an embodiment, the system includes a first servomechanism that is controlled by the controller and is constructed and arranged to move the non-contact sensor to a position and/or orientation having substantially the same perspective as the recorder. In an embodiment, the system includes a second servomechanism that is controlled by the controller and is constructed and arranged to move the recorder. The first servomechanism is synchronized with the second servomechanism so that movement of the non-contact sensor is synchronized with movement of the recorder.

In an embodiment, the system includes a second sensor constructed and arranged to be in contact with the subject being recorded by the recorder and to sense movement and/or vibration of the subject. The controller is further configured to combine data received from the non-contact sensor and the second sensor and transform the combined data into the tactile data stream. In an embodiment, the controller includes a transformer constructed and arranged to mix sensors signals having different sampling rates and/or sensitivity and output the transformed combined data.

According to an aspect of the invention, there is provided a method that includes recording audio and/or video of a subject of interest with a recorder, and measuring movement and/or vibration of the subject of interest with a non-contact sensor associated with and having substantially the same perspective as the recorder. The method includes transforming, with a controller, the measured movement and/or vibration into a tactile data stream for sending to a haptic display device for playback with the recording of the audio and/or video of the subject of interest and providing haptic effects corresponding to the measured movement and/or vibration to a user of the haptic display device in synchronization with the recording.

In an embodiment, the method includes moving the non-contact sensor, with a first servomechanism controlled by the controller, to a position having substantially the same perspective as the recorder as the recorder moves and changes perspective. In an embodiment, the method includes moving the recorder, with a second servomechanism controlled by the controller. The first servomechanism is synchronized with the second servomechanism so that movement of the non-contact sensor is synchronized with movement of the recorder.

In an embodiment, the method includes sensing movement and/or vibration of the subject of interest with a second sensor in contact with the subject of interest, combining data received from the non-contact sensor and the second sensor, and transforming the combined data into the tactile data stream.

In an embodiment, the method includes transforming sensor signals having different sampling rates and/or sensitivity and outputting the transformed combined data.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

FIG. 1A schematically illustrates a system in accordance with an embodiment of the invention;

DETAILED DESCRIPTION

Figure 1B:
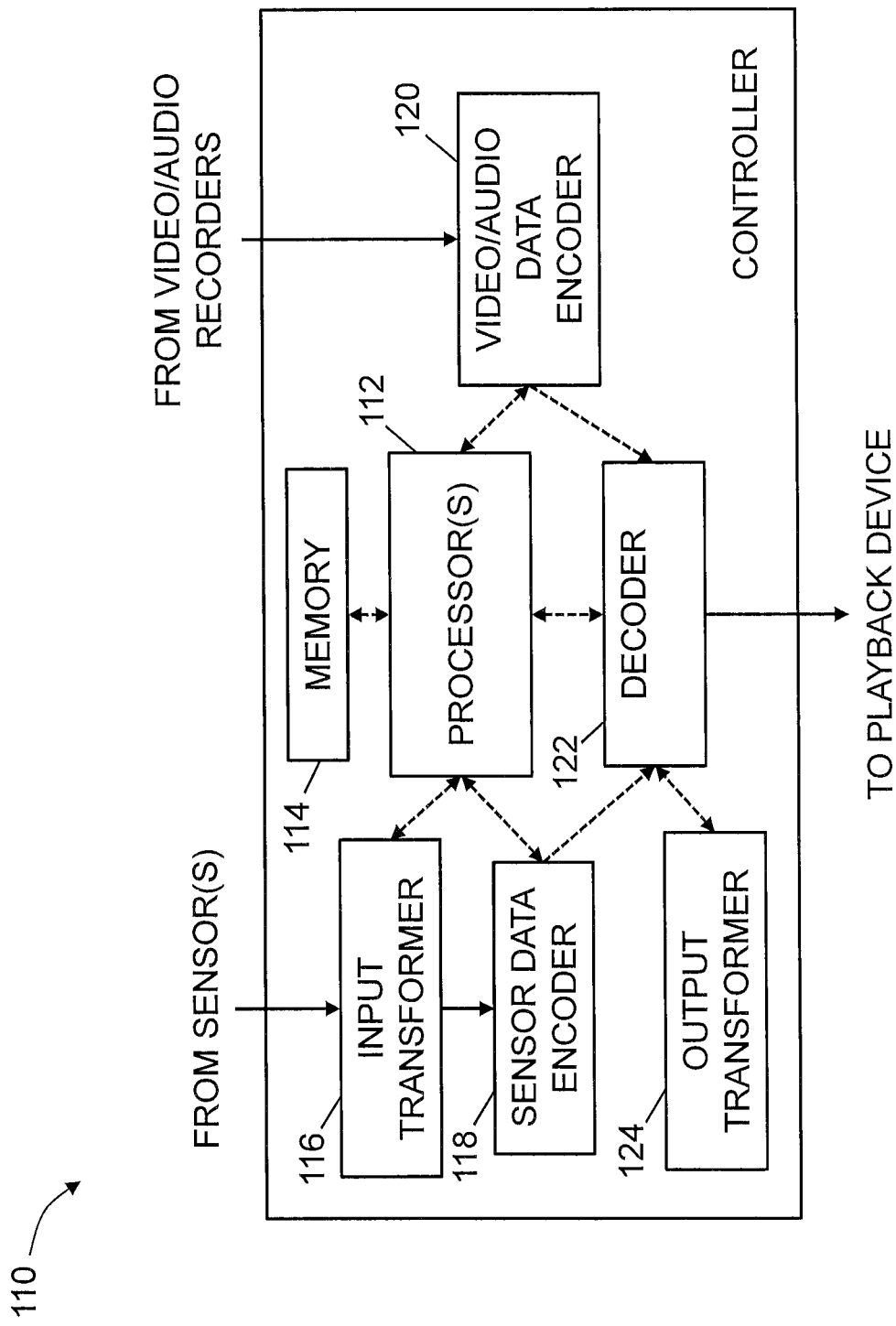
FIG. 1B schematically illustrates further details of a controller of the system of FIG. 1A.

FIG. 1A schematically illustrates a system 100 in accordance with an embodiment of the invention. As illustrated, the system 100 includes one or more sensors 102, which are configured to sense movement and/or vibrations experienced by a subject of interest of an event from a distance, and convert the sensed movement and/or vibrations into tactile effect data for playback to a user of an electronic playback device 130 as haptic effects, as described in further detail below. In an embodiment, the sensor 102 is a non-contact sensor, as described in further detail below.

In an embodiment, the sensor 102 is constructed and arranged to sense the motion and/or vibration of players and/or equipment or other subject of interest as part of a sporting event, etc. In an embodiment, ambient motion and vibration on a playing field/rink/court and boundaries of the playing field/rink/court, etc., may be sensed by the sensor 102. Embodiments of the sensor 102 are described in further detail below. The vibration that is sensed by the sensor 102 may be in any frequency range, even if the vibration frequency range may not be normally felt by human mechanoreceptors. In such an embodiment, the vibration may then be converted or translated into the mechanoreceptive range during the transformation of the sensor data. Transformation of the sensor data into tactile effect data is described in further detail below.

The system 100 also includes one or more cameras 104 constructed and arranged to capture images and sounds of the subject of interest. The camera 104 may include an integral video/audio recorder or may include separate video and audio recorders, denoted by 106 and 108, respectively, in FIG. 1A. The audio recorder 108 may include one or more microphones constructed and arranged to capture the sounds associated with the event. For example, if the event is a football game, one or more microphones may be placed at field level on a sideline of the playing field and one or more microphones may be placed at locations above the playing field, as is currently done during broadcasts of football games, for example. As used herein, "camera" refers to the combination of the video recorder 106 and the audio recorder 108, even if the two recorders are not co-located and are physically separate. In an embodiment, the sensor(s) 102, the video recorder 106, and the audio recorder 108 may be part of the same electronic device. In an embodiment, the sensor(s) 102, the video recorder 106, and the audio recorder 108 may be separate, stand-alone devices or part of separate, stand-alone devices.

As illustrated in FIG. 1A, the system 100 also includes a controller 110 constructed and arranged to output control signals to the sensor(s) 102, the video recorder 106 and the audio recorder 108 and to also receive data signals from the sensor(s) 102, the video recorder 106 and the audio recorder 108 for further processing and ultimate transmission to the electronic playback device 130. The controller 110 includes one or more processors 112 constructed and arranged to process signals and data output by the sensor(s) 102, the video recorder 106, and the audio recorder 108. The processor(s) 112 may be programmed to execute computer program modules comprising executable instructions for carrying out various functions of the controller 110, as described in further detail below. In an embodiment, the sensor(s) 102 may include processor(s) that are separate from the processor(s) 112 or the processor(s) 112 may be part of the sensor(s).

The electronic playback device 130 includes a haptic output device 132 configured to output haptic effects to a user of the electronic playback device 130, a display 134 configured to display images, such as the images captured by the video recorder 106, and a speaker 136 configured to output sound, which may be the sound captured by the audio recorder 108. In an embodiment, the haptic output device 132 may be part of a wearable device, such as a bracelet, watch, arm band, head band, head mounted display, etc. In an embodiment, the haptic output device 132, the display 134, and the speaker 136 may be separate devices that are configured to communicate with each other through a wireless connection, for example. In an embodiment, the haptic output device 132 may be part of a wearable device, the display 134 may be part of a television, and the speaker 136 may be a wireless speaker that is separate from the display 134.

The haptic output device 132 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys, a macro-composite fiber actuator, an electro-static actuator, an electro-tactile actuator, and/or another type of actuator that provides a physical feedback such as a haptic (e.g., vibrotactile) feedback. The haptic output device 132 may include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on.

FIG. 1B illustrates further details of an embodiment of the controller 110. The controller 110 may be a general-purpose or specific-purpose microcontroller for managing or controlling the operations and functions of the system 100. For example, the controller 110 may be specifically designed as an application-specific integrated circuit ("ASIC") to control output signals to the haptic output device 132 to provide haptic effects. The controller 110 may be configured to decide, based on predefined factors, what haptic effects are to be generated, the order in which the haptic effects are generated, and the magnitude, frequency, duration, and/or other parameters of the haptic effects. The controller 110 may also be configured to provide streaming commands that may be used to drive the haptic output device 132 for providing a particular haptic effect. In an embodiment, the controller 110 may include more than one processor 112, i.e. a plurality of processors 112, each configured to perform certain functions within the system 100. The controller 110 may also include electronic memory that includes one or more storage devices that may include haptic effect profiles, instructions for how the haptic output device 132 is to be driven, and/or other information for generating haptic effects. In an embodiment, the electronic memory 114 may be part of the processor 112.

The electronic memory 114 may be used to store data sensed by the sensor(s) 102, data that is recorded by the video recorder 106, and data that is recorded by the audio recorder 108. The electronic memory 114 may include one or more internally fixed storage units, removable storage units, and/or remotely accessible storage units. The various storage units may include any combination of volatile memory and non-volatile memory. The storage units may be configured to store any combination of information, data, instructions, software code, etc.

As illustrated, the controller 110 also includes an input transformer 116, a sensor data encoder 118, a video/audio data encoder 120, a decoder 122, and an output transformer 122. As discussed above, the data generated by the sensor(s) 102 may be stored in the electronic memory 114. In addition, the data generated by the sensor(s) 102 may be transformed by the input transformer 116 prior to being stored in the electronic memory 114. The transformation of the sensor data is considered to be an optional step and whether the transformation is needed may depend on the nature of the sensors being used. For example, in embodiments that use multiple sensors 102 that each use a different frequency for sampling, etc., the input transformer 116 may be used to transform the data such that the data may be combined into a single data stream having the same frequency, etc.

In an embodiment, the sensor data encoder 118 may be configured to place the sensor data during recording into a flexible container format, such as an MPEG-4 file, that allows for the storage of data other than video and audio in a single file container. Similarly, the video/audio data encoder 120 may be configured to place the video and audio data during recording into a container format, such as an MPEG-4 file. In an embodiment, software may be written to store the sensor data in a separate file, but with special markers in the sensor data to allow for proper synchronization with the video/audio data at playback time. In such an embodiment, very little input transformation may need to be applied, beyond shaping the sensor data to conform to the limitations of the designed recording format. The exact format may be determined by the implementer. Once the user recording the event has completed his or her activity, the recording may be stopped. The MPEG-4 file may be closed, and all of the sensor data may reside in the MPEG-4 file in the electronic memory 114 with the video/audio data.

The decoder 122, which may be part of the controller 110 as illustrated or may be part of a media player of the electronic playback device 130 that is configured to playback the media file, is configured to read the data generated by the sensor(s) 102 from the electronic memory 114, and associate the data temporally with the audio data and video data that were recorded and stored in the electronic memory 114. During media playback, the decoder 122 may pass the sensor data through an output transformer 124 configured to transform the sensor data into a haptic output signal to generate one or more haptic effects or haptic sensory commands, which include but are not limited to, vibration, surface friction modulation, skin pinch, skin squeeze, etc. The decoder 122 may be configured to synchronize the haptic output signal that was transformed from the sensor data with the video/audio data so that the haptic effect is synchronized with the video and audio during playback. In an embodiment, the synchronization may be completed by ensuring that time is the same in the video data, the audio data, and the haptic effect during playback.

The haptic output signal may then be transmitted from the decoder 122 to the haptic output device 132 so that the person(s) experiencing the media through the electronic playback device 130 that includes the haptic output device 132 may more fully experience the event being played back. The electronic playback device 130 may be any device, such as an electronic handheld device, such as a mobile phone, gaming device, personal digital assistant ("PDA"), portable e-mail device, portable Internet access device, tablet, etc. The electronic playback device 130 may include, but is not limited to, a handheld device or wearable device with the display 134, which may be a high definition display, that displays the media, and a handheld object that is capable of producing haptic sensations or effects, or an object attached to the user's body, leaning up to the user's body, or otherwise able to transmit tactile sensations and haptic effects to the user. The synchronization of all of the data streams containing vibration, video, and audio data may be managed by recording software, which may reside in the processor(s) 112 of the system 100 illustrated in FIGS. 1A and 1B.

Either at a later time, or concurrently with the activity being performed, one or more viewers may be interested in experiencing the activity. To playback the activity, the viewer may launch the appropriate playback software on their individual electronic playback device 130. In an embodiment, the playback software may include a player software application that incorporates the sensor decoding scheme performed by the decoder 122 described above, as well as output transform software that may be run by the output transformer 124, in order to transform the sensor data into a haptic output signal suitable for the haptic output device 132 in the electronic playback device 130. In an embodiment, a player software application may incorporate the sensor decoding scheme. The player software may rely on the output transform software being resident or otherwise pre-installed on the electronic playback device 130, and such output transform software may transform the sensor data into the haptic output signal suitable for the haptic output device 132 in the electronic playback device 130. In other words, the output transformer 124 and/or decoder 122 may be located on the electronic playback device 130.

In an embodiment, the electronic playback device 130 may be configured to decode the stream of video and tactile effect data, and maintain the synchronization between the video and the tactile effect data. A single microcontroller in the electronic playback device 130 may, for example, control both the video display 134 and the haptic output device 132 based on the video and tactile effect data streams. In an embodiment, a player software application may rely on the playback device's operating system software to perform the media playback, which incorporates the sensor decoding scheme. The operating system software may rely on the output transform software being resident or otherwise pre-installed on the electronic playback device 130, such output transform software transforming the sensor data into a haptic output signal suitable for the haptic output device 132 in the electronic playback device 130. The viewer may then experience haptic effects associated with the viewing of the event or performance, such haptic effects being produced by the output transform software. In an embodiment, the output transformation may occur outside of the electronic playback device 130 and instead may occur on server(s) owned by broadcaster(s) and stored in the cloud. In such an embodiment, multiple versions of the haptic track may be generated for different devices and/or device types and the appropriate haptic track may be selected and transmitted to the haptic output device 132 in the electronic playback device 130.

In an embodiment, the video, audio and sensor data streams may be synchronized, merged, and transmitted to the playback device 130. The synchronization may, for example, be done by including a timestamp on every video frame and sensor measurement, keeping in mind that the capture may take place on independent devices that communicate through a wired or wireless network. The recording device may therefore need to obtain a shared time reference, for example from a GPS system. In an embodiment, synchronization may be performed by performing a specific action that is detectable in both the video and the sensor data streams.

The resulting data may be transmitted as a single data stream combining vibrations and video, which also includes audio, or two data streams with synchronization information. The data stream may be transmitted gradually to the electronic playback device 130, or stored in a file for later playback. In an embodiment, the haptic effects may be produced offline using editing tools and added to the video in post-production.

The video may be played back at a later time or streamed in real time, in both cases either to one or more recipients. The video may be played back on several devices, including but not limited to smartphones or tablets, computers, home theater systems, etc. The haptic effects may similarly be produced using different haptic output devices 132 located on a smartphone or a tablet, a wearable device, such as a head mounted display device, a wristband, a ring or a glove, or a piece of furniture, such as a chair or a desk.

Figure 2A:
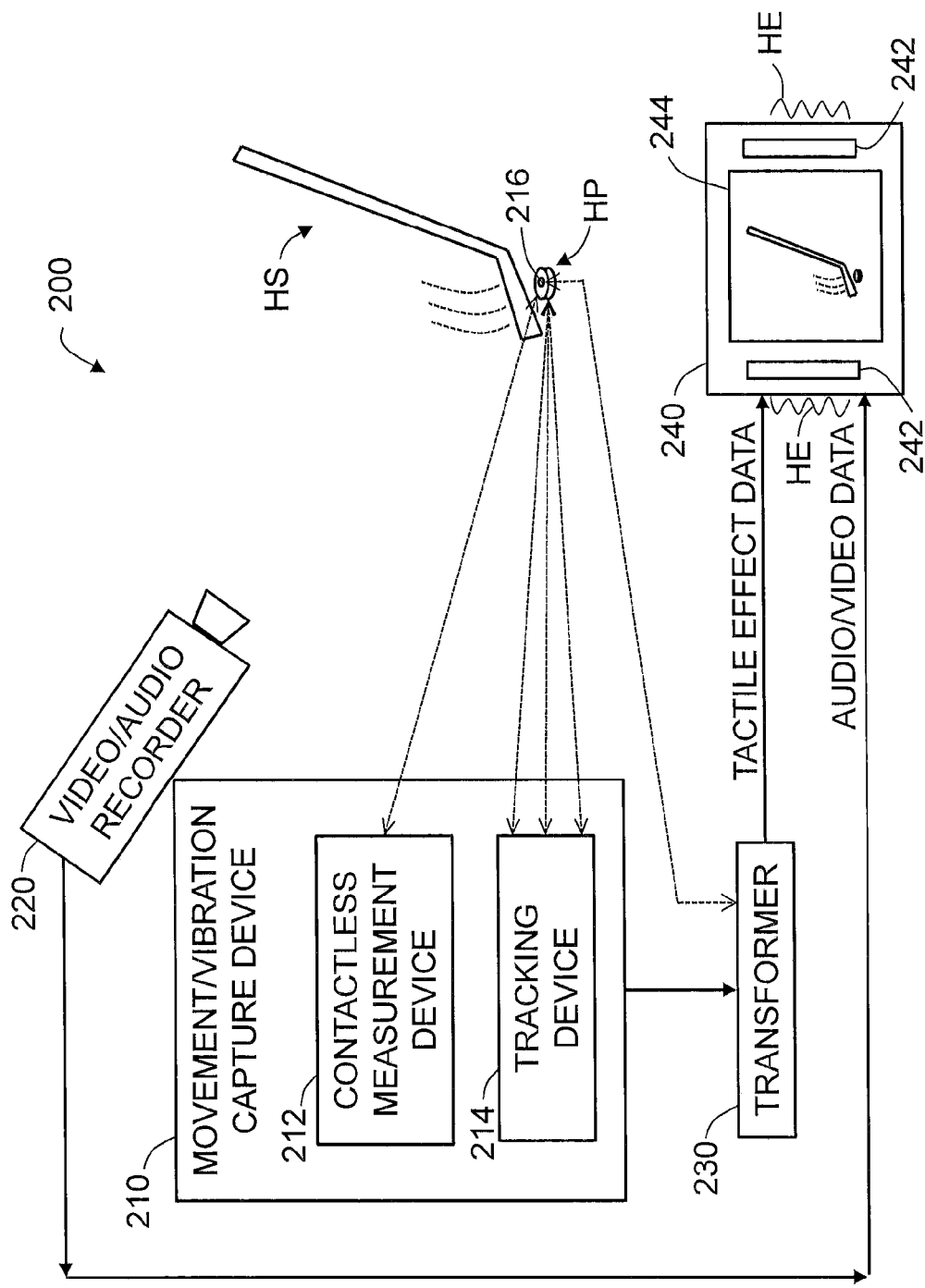
FIG. 2A schematically illustrates an implementation of the system of FIG. 1 in accordance with an embodiment of the invention.

FIG. 2A schematically illustrates a system 200 that is an embodiment of the system 100 described above with respect to FIGS. 1A and 1B. In the embodiment illustrated in FIG. 2A, the sensor(s) 102 may include a movement/vibration capture device 210, which may include a contactless measurement device 212 constructed and arranged to measure movement and/or vibrations of the subject of interest and/or a tracking device 214 constructed and arranged to measure movement and/or vibrations of the subject of interest. Although both the contactless measurement device 212 and the tracking device 214 are illustrated as being part of the movement/vibration device 210, in some embodiments, the movement/vibration device 210 may include only one of the contactless measurement device 212 or the tracking device 214. The system 200 also includes a video/audio recorder 220, a transformer 230 and an electronic playback device 240, which includes at least one haptic output device 242 configured to generate haptic effects HE representing the movement and/or vibrations captured by the movement/vibration capture device 210, and a display 244 configured to display the images captured by the video/audio recorder 220.

In an embodiment, the contactless measurement device 212 may be a laser vibrometer that is configured to measure the vibration of the subject of interest. As is known in the art, a laser vibrometer, in use, emits a laser beam at a first frequency directed towards the subject of interest and measures a second frequency of the laser beam that is reflected by the subject of interest and detected by a photodetector. If the surface of the subject is moving, e.g. vibrating, there will be a shift in the frequency such that the second frequency is different from the first frequency. The shift in frequency can then be correlated to the vibration of the subject of interest. The tracking device 214 may be configured to track movement of the subject of interest in up to three dimensions so that vibrations of the subject of interest can be determined via image analysis by known methods. In an embodiment, the movement and/or vibration may be derived from a two dimensional or three dimensional video stream using image analysis software.

In an embodiment, one or more additional sensors 216 configured to sense movement and/or vibrations, such as an accelerometer, may be placed on the subject of interest. Such sensor(s) 216 are different from the non-contact sensor(s) described herein in that they are in contact with the subject instead of not being in contact with the subject of interest.

In an embodiment, one or more additional sensors (not shown) may include optical sensors configured to track a change in the light field surrounding the subject of interest in a particular range, and a change in the light field may be used as the sensor data indicative of movement/vibration.

As also illustrated in FIG. 2A, the video/audio recorder 220, which may be a camera, may be implemented as the video recorder 106 and audio recorder 108 described above with respect to FIG. 1A and configured to capture images of and sounds from the subject of interest. Although the video/audio recorder 220 is illustrated as an integral device, embodiments of the invention cover arrangements in which the video recorder is separate from the audio recorder, as described above. In an embodiment, the movement/vibration capture device 210 and the video/audio recorder 220 may be co-located on the same electronic device.

The data captured by the movement/vibration capture device 210 and the contact sensor 216 may be processed by the transformer 230 and output as tactile effect data for transmission to the electronic playback device 240. In an embodiment, the tactile effect data may be stored alongside, or interleaved with, audio-visual data for later rendering or for immediate broadcast for live event spectator consumption.

In an embodiment, sensor data fusion techniques, such as Kalman filtering may be used by the transformer 230 if the different sensors 212, 214, 216 use different sampling rates and/or have different sensitivity, for example. The tactile effect data that is output by the transformer 230 may be encoded prior to transmission to the electronic playback device 240 and decoded upon playback on the electronic playback device 240. The media data captured by the video/audio recorder 220 may also be transmitted to the electronic playback device 240 as audio/video data and may be encoded as discussed above prior to transmission and decoded upon playback on the electronic playback device.

In the embodiment illustrated by FIG. 2A, the event being recorded by the system is a hockey game and the subject of interest at the moment is a hockey puck HP being struck by a hockey stick HS. The non-contact movement/vibration capture device 210 records the movement/vibration of the hockey puck HP as it is struck by the hockey stick HS. At the same time, the contact sensor 216 in contact with the hockey puck HP measures the vibration generated by the striking of the hockey puck HP with the hockey stick HS. The data recorded by the movement/vibration capture device 210 and the contact sensor 216 are processed and transformed by the transformer 230 into tactile effect data and transmitted to the electronic playback device 240 alongside or interweaved with the audio/video data. Upon receipt of the transmission, the electronic playback device 240 may store the data in electronic memory for playback at a later time, or may proceed to display the video images on the display 244 and display a haptic effect HE corresponding to the sensed vibration with the haptic output device 242 so that the user holding the electronic playback device 240 can feel the vibration associated with the hockey stick HS hitting the hockey puck HP.

In an embodiment, the electronic playback device 240 may be the electronic playback device 130 of FIG. 1, and may be in the form of a mobile phone or tablet having the display 134, the speaker 136, and a vibration device as the haptic output device 132 to provide the haptic effect. In an embodiment, the haptic output device 242 may be part of an electronic device that is constructed and arranged to be held by or be attached to the user of the device. For example, the haptic display device 242 may be part of a mobile phone, such as a smartphone, a tablet, a gamepad, a wearable device, such as a smartwatch, a wrist band, an arm band, a head band, a head-mounted display, etc.

In order to maintain the egocentric video/audio recorder (i.e. camera 104) perspective, the sensor 102 should track the camera 104 point-of-view in a perceptually meaningful way. For example, if the camera 104 is following a football during a football game, then the sensor 102 should be moved to maintain a synchronized perspective with the camera 104. This synchronization between the camera 104 and the sensor 102 may be achieved in a variety of ways. In an embodiment, object tracking using markers or video based tracking techniques may be used. In an embodiment, the position and orientation of the camera 104 and the sensor 102 may be manually controlled by the operator of the camera 104 and sensor 102.

Figure 2B:
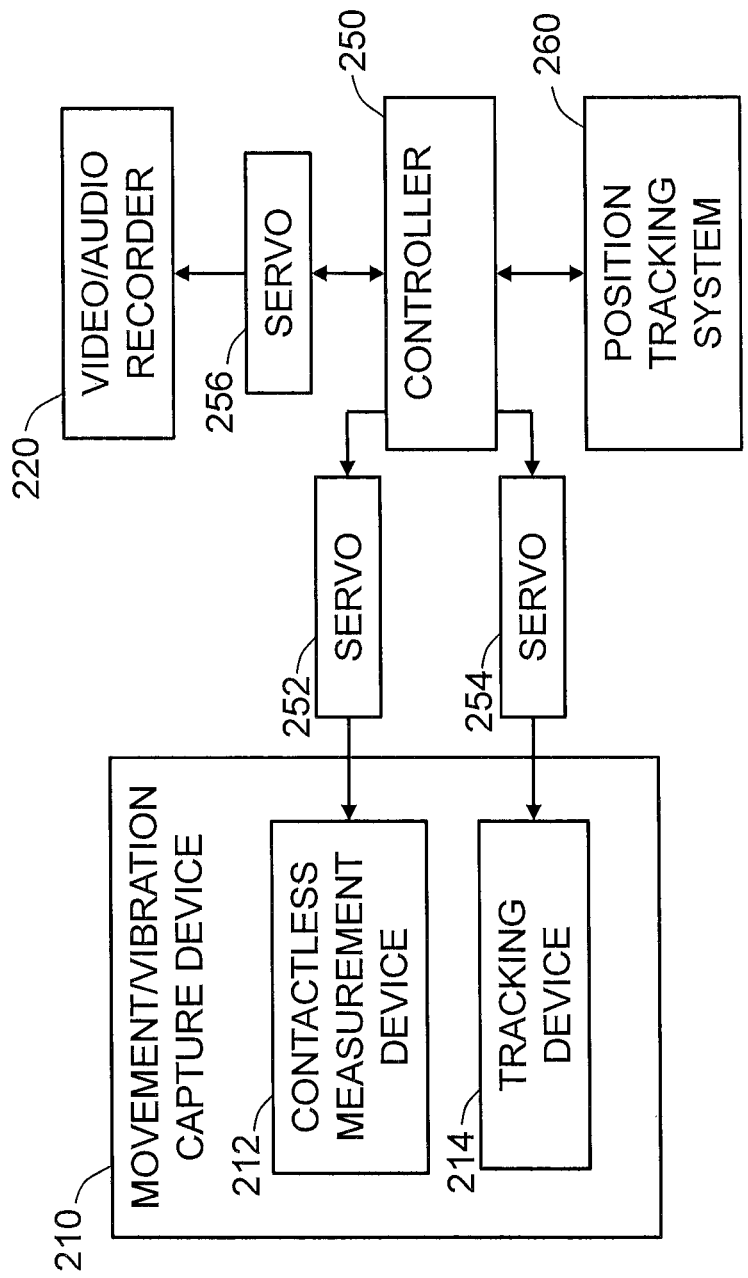
FIG. 2B schematically illustrates further details of the embodiment of the invention illustrated by FIG. 2A.

In an embodiment illustrated in FIG. 2B, servo matching of the position and orientation of the video/audio recorder 220 (i.e. camera) to the movement/vibration capture device 210 (i.e. non-contact sensor) may be used. As illustrated, the system also includes a controller 250, a first servomechanism ("servo") 252 controlled by the controller 250 and constructed and arranged to control the position and/or orientation of the contactless measurement device 212, a second servomechanism ("servo") 254 controlled by the controller 250 and constructed and arranged to control the position and/or orientation of the tracking device 214, and a third servomechanism ("servo") 256 controlled by the controller 250 and constructed and arranged to control the position and/or orientation of the video/audio recorder 220. The controller 250 may include a processor configured to execute three-dimensional image analysis software that provides the controller 250 with a subject marker that can be translated into servo position commands for the servos 252, 254, 256. In an embodiment, the three-dimensional image analysis software may comprise algorithms to determine the movement/vibrations of the subject and output a signal that may be transformed into the haptic effect to be displayed to the user of the electronic playback device. In an embodiment, the controller 250 may be commanded by a position tracking system 260 that tracks the subject of interest in three-dimensional space by using technology similar to existing beacon & triangulation systems. The position tracking system 260 provides a subject marker that may be translated into servo position commands for the controller 250.

Figure 3:
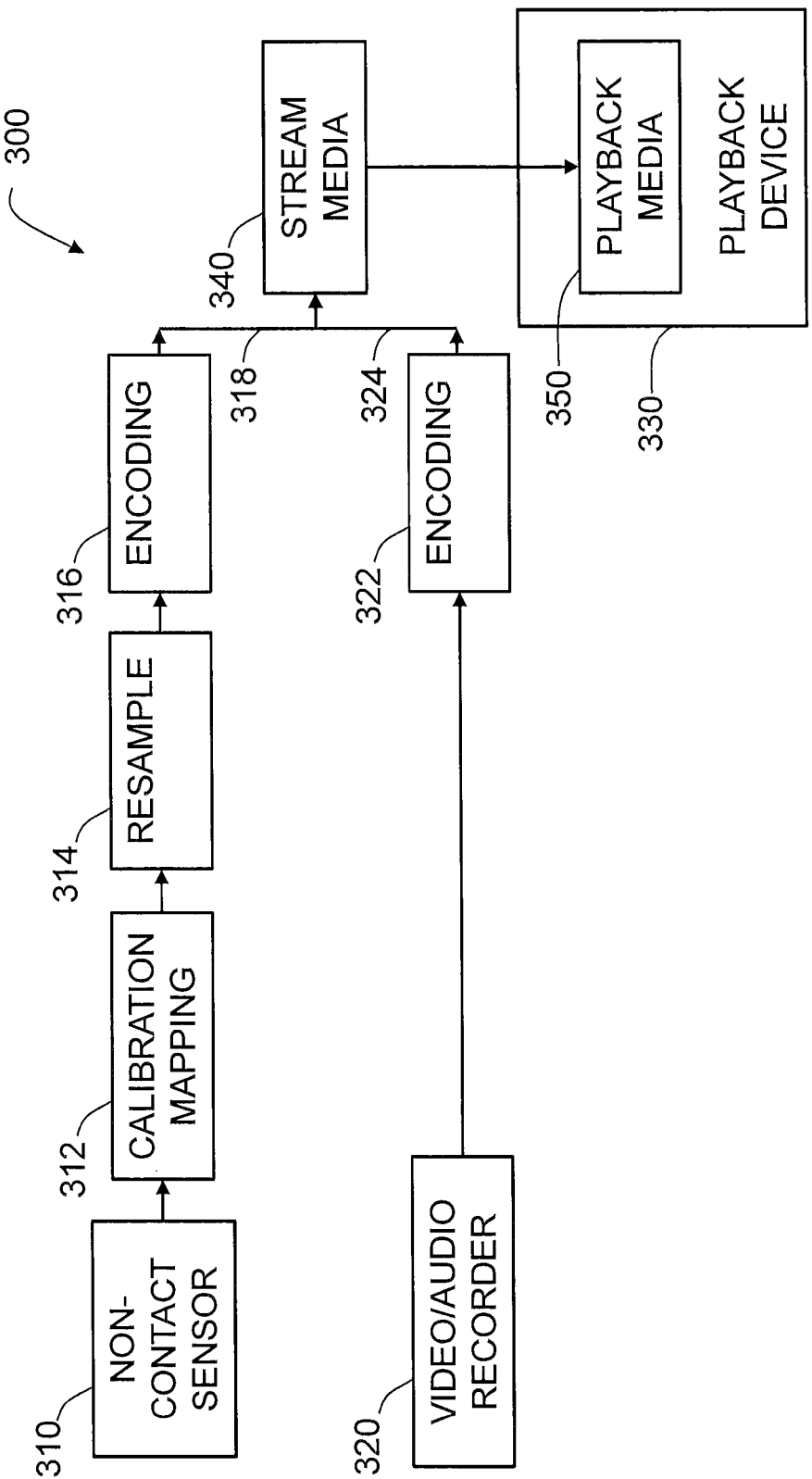
FIG. 3 schematically illustrates data flow from a non-contact sensor and a video/audio recorder to a playback device in accordance with an embodiment of the invention.

FIG. 3 illustrates an embodiment of data flow 300 from a non-contact sensor 310 and a video/audio recorder 320 to an electronic playback device 330. As illustrated, data output by the sensor 310 undergoes calibration mapping at 312, is resampled at 314, and is encoded at 316 using a format known to those skilled in the art, such as the format discussed above, with an encoder. After the data is encoded, the encoder outputs a signal 318 to be incorporated into media 340 that may be streamed via the Internet, for example, for consumption as playback media 350 on the electronic playback device 330. At the same time or substantially the same time, data from the video/audio recorder 320 is encoded at 322 with an encoder using a format known to those skilled in the art, such as the format discussed above, to prepare an encoded signal 324 to be incorporated into the media 320 that is streamed to the playback device 330. The encoded signals 318, 324 may be synchronized before being streamed (or otherwise delivered) to the playback device 330, or the encoded signals 318, 324 may be synchronized locally on the playback device 330 after being delivered to the playback device 330, as discussed above. The encoded signals 318, 324 may be streamed along-side each other or may be interleaved into a single signal.

Figure 4:
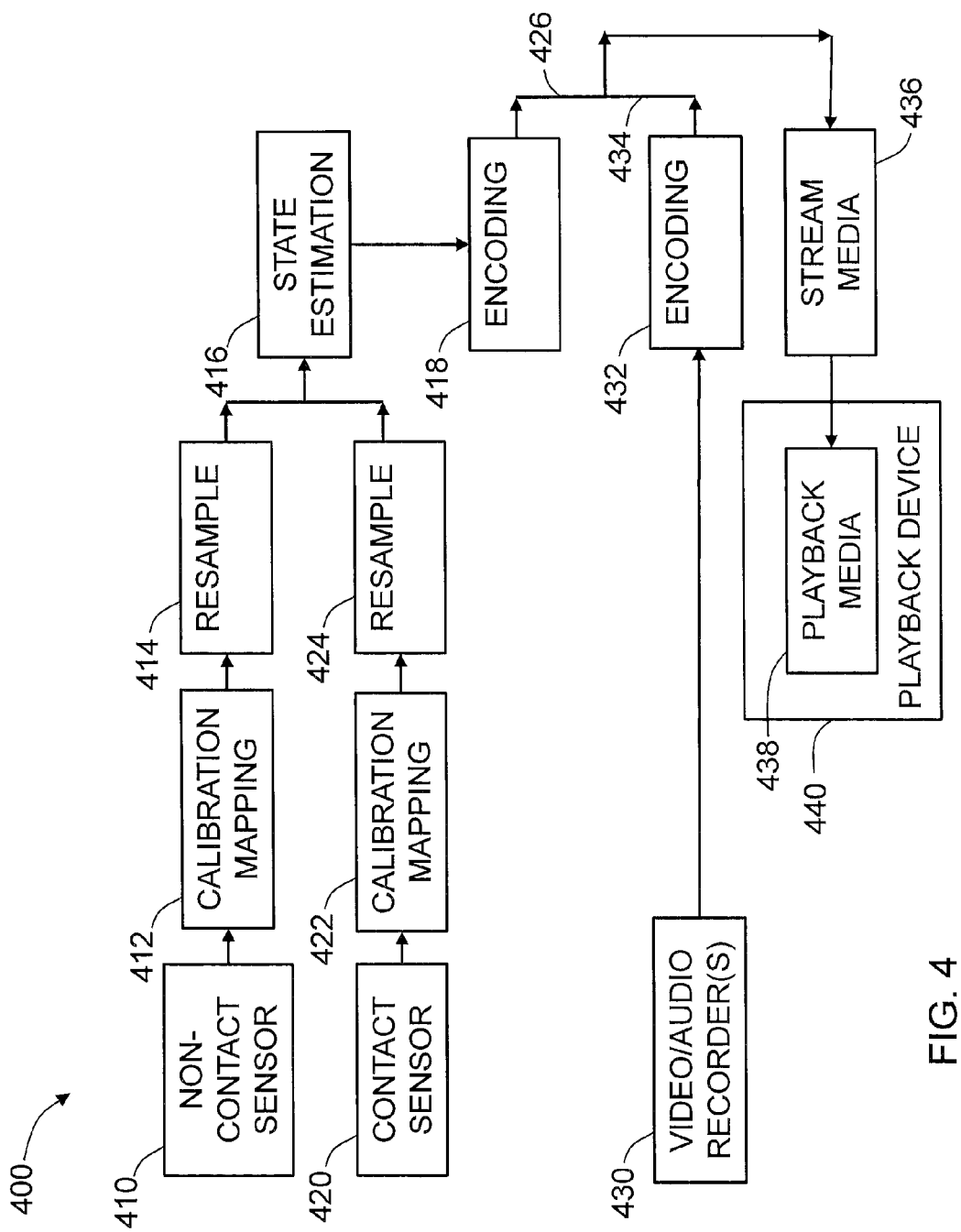
FIG. 4 schematically illustrates data flow from a non-contact sensor, a contact sensor and a video/audio recorder to a playback device in accordance with an embodiment of the invention.

FIG. 4 illustrates an embodiment of data flow 400 from more than one sensor, such as a non-contact sensor 410 measuring vibrations of a subject of interest and a contact sensor 420 that is in contact with the subject of interest, and a video/audio recorder 430 recording the subject of interest to an electronic playback device 440. In an embodiment, the sensor data may be processed to ensure calibration and sample rate consistency. Multiple sensor data channels may then be combined using various techniques, such as state estimation, mixing, averaging, etc. in order to generate a single haptic signal. In the embodiment illustrated in FIG. 4, the data output by the non-contact sensor 410 undergoes calibration mapping at 412 and is resampled at 414. The data output by the contact sensor 420 undergoes calibration mapping at 422 and is resampled at 424. The data after being resampled at 414 and 424 is transformed at 416 for state estimation so that if the data in the two streams is at different frequencies, for example, the data signals can be estimated and transformed into a single data signal for encoding at 418 by an encoder using a format known to those skilled in the art, such as the format discussed above. In an embodiment, the data in the two streams may be transformed into a haptic output stream that may consist of one or more haptic data channels. The encoder outputs a signal 426 to be incorporated into media 436 that may be streamed via the Internet, for example, for consumption as playback media 438 on the playback device 440. At the same time or substantially the same time, data from the video/audio recorder 430 is encoded at 432 with an encoder using a format known to those skilled in the art, such as the format discussed above, to prepare an encoded signal 434 to be incorporated into the media 436 that is streamed to the playback device 440. The encoded signals 426, 434 may be synchronized before being streamed or otherwise delivered to the playback device 440, and the encoded signals 426, 434 may be synchronized locally on the playback device 440 after being delivered to the playback device 440 but before being played back as the playback media 438, as discussed above. The encoded signals 426, 434 may be streamed along-side each other or may be interleaved into a single signal.

In both embodiments illustrated in FIGS. 3 and 4, the output of the field based tactile sensing may include two distinct types of data encoding, such as RAW master recording that includes the complete and un-mixed sensor data from the field sensor sources, and downmix recording that includes the mixed and broadcast ready tactile track and is the final mixed product of all tactile sensors as broadcast. In some embodiments, the downmix recording may be available for each camera at the event. Due to differences in sensor technologies, the RAW recordings may have a variety of sample rates, and the downmix may conform to a standard sample rate (e.g. 200 Hz) in order to facilitate downstream mixing and end-device rendering.

According to embodiments of the invention, the systems 100, 200 described above may be media server driven. The media server may be a cloud video streaming service such as, for example, NETFLIX®, a broadcast network-provided service such as, for example, NBC, a gaming console such as, for example Xbox by Microsoft, or any other type of server. The tactile effect data may be provided as a signal that is communicated, either wired or wirelessly, from the media server to the electronic playback device 130, 240. The signal can be anything from a direct tactile effect stream or set of commands, to any abstract indication to the haptic output device 132, 242 that a number of actions must be performed, wherein one of the actions performed is the rendering of a haptic effect based on the tactile effect data.

According to embodiments of the invention, the systems 100, 200 may be PVD driven. The PVD may be configured to recognize the tactile effect data signal and then send either the same tactile effect data signal, or a different signal transformed from the tactile effect data signal, that ultimately results in haptic effects being generated by the haptic output device 132, 242.

Figure 5:
FIG. 5 schematically illustrates a method in accordance with an embodiment of the invention.

FIG. 5 illustrates a method 500 in accordance with an embodiment of the invention. At 510, a video and/or audio is/are recorded by a recording device, such as the video recorder 106 and/or audio recorder 108 or the video/audio recorder 220 described above. At 520, movement and/or vibrations are sensed by at least one non-contact sensor, such as the movement/vibration capture device 210 described above. In an embodiment, the movement/vibration data may be transformed into a tactile data stream. At 530, the video and the vibrations in the tactile data stream are synchronized using a processor, such as the processor 112 described above. At 540, the synchronized video and/or audio and vibrations are played back using an electronic playback device, such as the electronic playback device 130 described above that includes the display 134, the speaker 136 and the haptic output device 132, or the electronic playback device 240 described above.

Embodiments of the invention described above capture movement and/or vibration of a subject of interest with the intent of using the movement/vibration capture to produce tactile effect data to be used alongside video and/or audio data in a multi-media data stream. The movement/vibration capture involves non-contact observation of the subject of interest.

Embodiments of the invention described above provide the ability to create a live broadcast of an event that incorporates at least one non-contact tactile sensor. Embodiments of the invention described above may be particularly useful for events that may have delicate or extreme environmental conditions not suitable for contact based tactile sensing.

Embodiments of the invention described above provide a camera-based egocentric sound field that can be extended to enable both audio and tactile feedback to be captured and rendered as part of a sports broadcast or pre-production shoot. Embodiments of the invention described above provide a combination of on-subject and non-contact tactile sensing technologies that can be mixed to create the appropriate end-user experience for each camera's point of view.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A system comprising:
a controller configured to control a first servomechanism and a second servomechanism;
a recorder configured to move by the first servomechanism, record an audio or a video of a subject of interest from a point-of-view of the recorder, and output a recording of the subject of interest; and
a non-contact sensor associated with the recorder, the non-contact sensor configured to move by the second servomechanism to maintain a same point-of-view as the point-of-view of the recorder and measure a movement or a vibration of the subject of interest from the same point-of-view as the point-of-view of the recorder and at a same time as the recorder recording the audio or the video,
wherein the controller is further configured to transform the movement or the vibration of the subject of interest measured by the non-contact sensor into a tactile data stream for sending to a haptic display device for playback with the recording of the subject of interest by the recorder and providing haptic effects corresponding to the movement or the vibration to the haptic display device in synchronization with the recording.

2. The system according to claim 1, wherein the non-contact sensor comprises a laser vibrometer.

3. The system according to claim 1, wherein the non-contact sensor comprises a tracking device.

4. The system according to claim 1, wherein the non-contact sensor comprises video stream analysis algorithms.

5. The system according to claim 1, wherein the recorder and the non-contact sensor are co-located on a same device.

6. The system according to claim 1, wherein the second servomechanism is configured to move the non-contact sensor to a position or an orientation having the same point-of-view as the point-of-view of the recorder.

7. The system according to claim 6, wherein the first servomechanism is synchronized with the second servomechanism so that a movement of the non-contact sensor is synchronized with a movement of the recorder.

8. The system according to claim 1, further comprising a second sensor configured to be in contact with the subject of interest being recorded by the recorder and to sense a second movement or a second vibration of the subject of interest, wherein the controller is further configured to combine data received from the non-contact sensor and the second sensor to obtain combined data and transform the combined data into the tactile data stream.

9. The system according to claim 8, wherein the controller comprises a transformer configured to mix sensor signals having different sampling rates or sensitivity to obtain the combined data and output the combined data.

10. A method comprising:
recording an audio or a video of a subject of interest with a recorder from a point-of-view of the recorder, wherein the recorder is configured to move by a first servomechanism that is controlled by a controller;
measuring a movement or a vibration of the subject of interest with a non-contact sensor associated with the recorder and having a same point-of-view as the point-of-view of the recorder and at a same time as the recording, wherein the non-contact sensor is configured to move by a second servomechanism that is controlled by the controller;
moving the non-contact sensor by the second servomechanism to maintain the same point-of-view as the point-of-view of the recorder; and
transforming, with the controller, the movement or the vibration into a tactile data stream for sending to a haptic display device for playback with the audio or the video of the subject of interest and providing haptic effects corresponding to the movement or the vibration to the haptic display device in synchronization with the audio or the video.

11. The method according to claim 10, wherein the moving the non-contact sensor, with the second servomechanism controlled by the controller, includes moving the non-contact sensor to a position having the same point-of-view as the point-of-view of the recorder as the recorder moves and changes its point-of-view.

12. The method according to claim 11, further comprising:
moving the recorder,
wherein the first servomechanism is synchronized with the second servomechanism so that a movement of the non-contact sensor is synchronized with a movement of the recorder.

13. The method according to claim 10, further comprising:
sensing a second movement or a second vibration of the subject of interest with a second sensor in contact with the subject of interest;
combining data received from the non-contact sensor and the second sensor to obtain combined data; and
transforming the combined data into the tactile data stream.

14. The method according to claim 13, further comprising:
transforming sensor signals having different sampling rates or sensitivity to obtain the combined data; and
outputting the combined data.

15. The method according to claim 10, wherein the recorder and the non-contact sensor are co-located on a same device.

16. A non-transitory computer readable medium having instructions stored thereon that, when executed by a processor, cause the processor to:
record, by a recorder, an audio or a video of a subject of interest from a point-of-view and output a recording of the subject of interest, wherein the recorder is configured to move by a first servomechanism that is controlled by a controller;
measure, by a non-contact sensor associated with the recorder, a movement or a vibration of the subject of interest from a same point-of-view as the point-of-view of the recorder and at a same time as the recorder recording the audio or the video, wherein the non-contact sensor is configured to move by a second servomechanism that is controlled by the controller;
move the non-contact sensor by the second servomechanism to maintain the same point-of-view as the point-of-view of the recorder; and
transform, by the controller, the movement or the vibration of the subject of interest measured by the non-contact sensor into a tactile data stream for sending to a haptic display device for playback with the recording of the subject of interest by the recorder and providing haptic effects corresponding to the movement or the vibration to the haptic display device in synchronization with the recording.

17. The computer readable medium according to claim 16, wherein the recorder and the non-contact sensor are co-located on a same device.

18. The computer readable medium according to claim 16, wherein the non-contact sensor is moved, by the second servomechanism, to a position or an orientation having the same point-of-view as the point-of-view of the recorder.

19. The computer readable medium according to claim 18,
wherein the first servomechanism is synchronized with the second servomechanism so that a movement of the non-contact sensor is synchronized with a movement of the recorder.

20. The computer readable medium according to claim 16, wherein the instructions, when executed by the processor, further cause the processor to:
sense a second movement or a second vibration of the subject of interest by a second sensor configured to be in contact with the subject of interest being recorded by the recorder;
combine data received from the non-contact sensor and the second sensor, by the controller, to obtain combined data; and
transform the combined data, by the controller, into the tactile data stream.

* * * * *